US 12,350,659 B2

(12) United States Patent
Silhan

(10) Patent No.: US 12,350,659 B2
(45) Date of Patent: Jul. 8, 2025

(54) DEVICE FOR THERMAL-CATALYTIC DECOMPOSITION-PYROLYSIS OF ORGANIC WASTE MATERIALS

(71) Applicant: Aikona Ltd, London (GB)

(72) Inventor: David Silhan, Radosovice (CZ)

(73) Assignee: Aikona Ltd, London (GB)

(*) Notice: Subject to any disclaimer, the term of this patent is extended or adjusted under 35 U.S.C. 154(b) by 179 days.

(21) Appl. No.: 17/769,405

(22) PCT Filed: Oct. 16, 2020

(86) PCT No.: PCT/IB2020/059752
§ 371 (c)(1),
(2) Date: Apr. 15, 2022

(87) PCT Pub. No.: WO2021/074872
PCT Pub. Date: Apr. 22, 2021

(65) Prior Publication Data
US 2024/0123414 A1    Apr. 18, 2024

(30) Foreign Application Priority Data
Oct. 17, 2019    (CZ) .............................. PV 2019-645

(51) Int. Cl.
*B01J 6/00* (2006.01)
*C10L 1/02* (2006.01)
*H05B 6/02* (2006.01)

(52) U.S. Cl.
CPC ............... *B01J 6/008* (2013.01); *H05B 6/02* (2013.01); *C10L 1/02* (2013.01); *C10L 2200/0469* (2013.01); *H05B 2214/03* (2013.01)

(58) Field of Classification Search
CPC ........ B01J 6/008; H05B 6/02; H05B 2214/03; C10L 1/02; C10L 2200/0469;
(Continued)

(56) References Cited

U.S. PATENT DOCUMENTS 3,519,539 A    7/1970   Schulte
3,813,890 A *  6/1974   Bligh ..................... F25J 3/0233
                                                          62/623
(Continued)

FOREIGN PATENT DOCUMENTS

CN    106518475 A    3/2017
CZ      2002374 A3   6/2002
(Continued)

OTHER PUBLICATIONS

International Search Report and Written Opinion dated Feb. 8, 2021 for related PCT Patent Application No. PCT/IB2020/059752 which was filed on Oct. 16, 2020 11 pages.
(Continued)

*Primary Examiner* — Jacob M Amick
*Assistant Examiner* — Charles J Brauch
(74) *Attorney, Agent, or Firm* — Hovey Williams LLP; Paul J. Walker

(57) ABSTRACT

The specification relates to the device for thermal-catalytic decomposition—pyrolysis of waste organic materials, comprising: the reservoir, linked by means of the supply line with the reactor, where in the line is arranged the valve, wherein the reactor contains the heating element and/or the radiation source situated approximately up to the maximum level corresponding to ⅓ of the height from the bottom of the reactor; and the temperature sensor placed up to the maximum level corresponding to ⅓ of the height from the bottom of the reactor, wherein the output line protrudes from the lid of the reactor with the linked cooler, wherein the end of the output line is connected to the orifice on the receiver to contain liquefied products via the branch to exhaust product gases.

9 Claims, 7 Drawing Sheets

(58) Field of Classification Search
CPC .... C10G 2300/1014; C10G 2300/1074; C10G 3/40; C10G 3/44; C10G 2300/1003; C10G 2300/107; C10G 1/008; C10G 1/00; C10G 3/60; Y02E 50/10; C10B 51/00; C10B 53/02; C10B 47/02; C10B 57/06; Y02P 30/20

See application file for complete search history.

(56) References Cited

U.S. PATENT DOCUMENTS

| | | | |
|---|---|---|---|
| 6,026,941 A | 2/2000 | Maienschein | |
| 6,035,791 A | 3/2000 | Hery | |
| 9,475,993 B1 | 10/2016 | Cudahy | |
| 2007/0251233 A1* | 11/2007 | Bardoll | F02D 33/02 60/602 |
| 2008/0086945 A1* | 4/2008 | Wunning | C10J 3/482 48/197 R |
| 2015/0059245 A1 | 3/2015 | Appel | |
| 2018/0010507 A1* | 1/2018 | Di Perna | B01D 53/94 |
| 2019/0100700 A1 | 4/2019 | Vicintin | |

FOREIGN PATENT DOCUMENTS

| | | |
|---|---|---|
| DE | 3726870 A1 | 2/1988 |
| EP | 2129746 A1 | 12/2009 |
| WO | 2012032530 A1 | 3/2012 |
| WO | 2015179806 A1 | 11/2015 |
| WO | 2017173165 A1 | 10/2017 |

OTHER PUBLICATIONS

Wey N.-Y., et al., The Autothermal Pyrolysis of Waste Tires; Journal of the Air and Waste Management Association (1995) vol. 45, No. 11, 30 ref(s). pp. 855-863.

Czech Republic Search Report dated Mar. 25, 2020 for related Czech Republic Application No. PV 2019-645 which was filed on Oct. 17, 2019 3 pages.

* cited by examiner

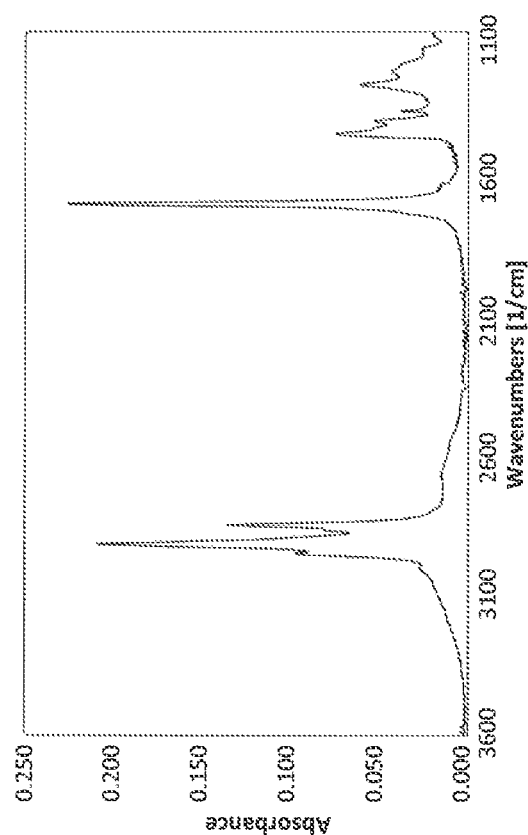
FIG. 5A: FTIR spectrum of sample PL8
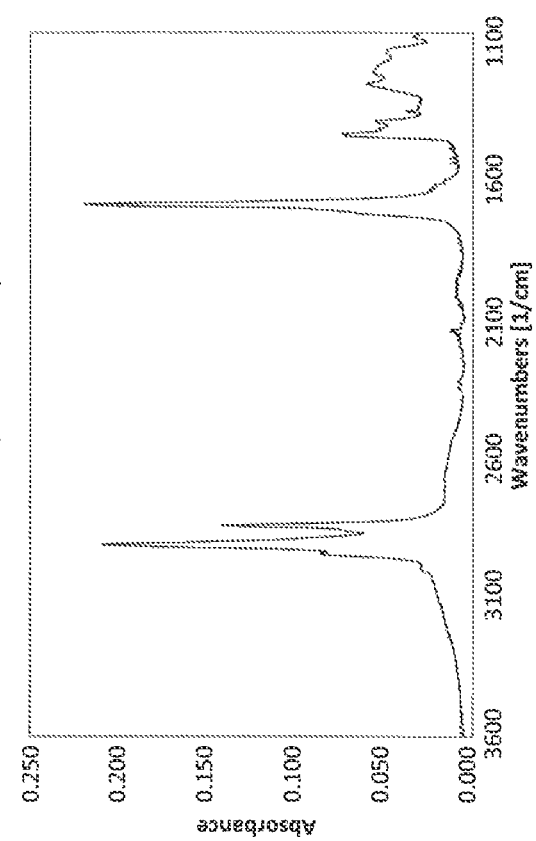
FIG. 5B: FTIR spectrum of sample PL9
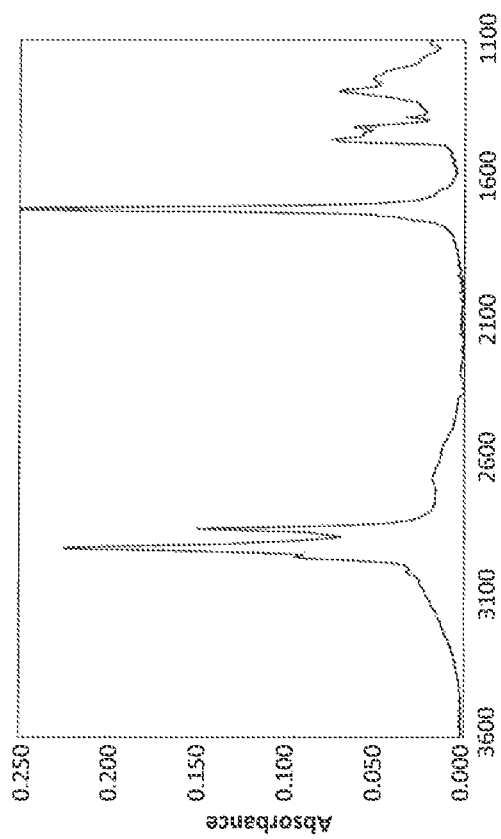
FIG. 5C: FTIR spectrum of sample PL10
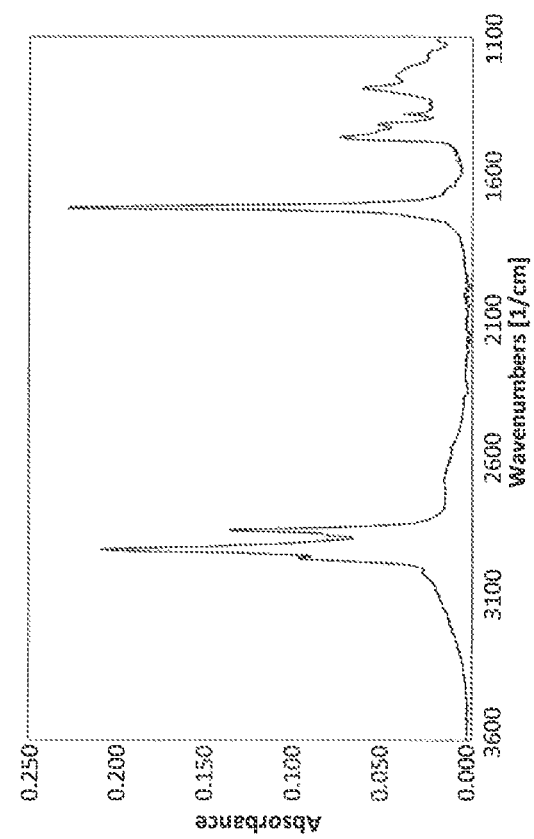
FIG. 5D: FTIR spectrum of sample PL11

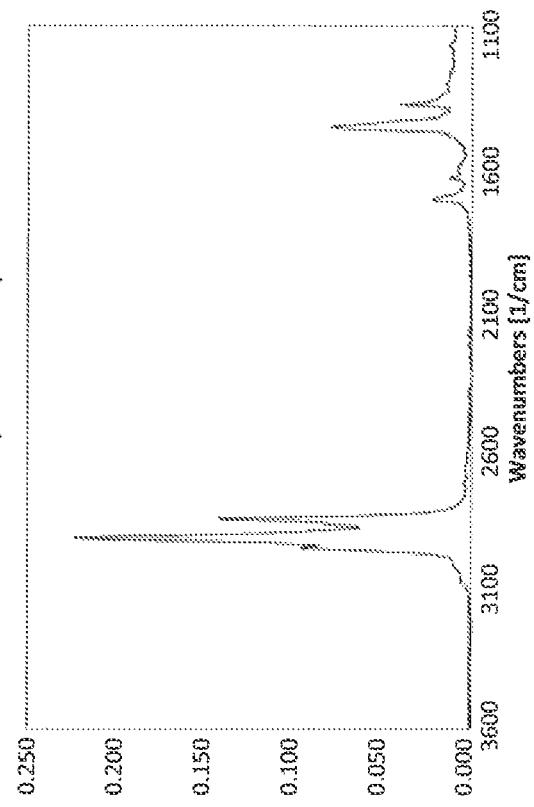
FIG. 5E: FTIR spectrum of sample PL12
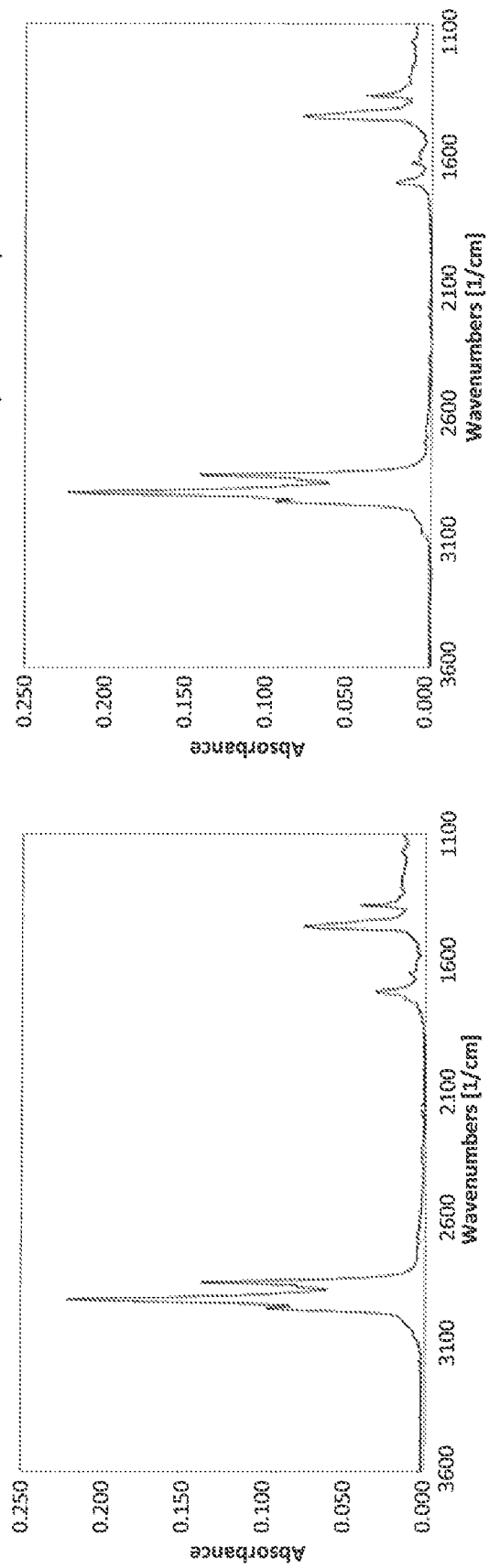
FIG. 5F: FTIR spectrum of sample PL13
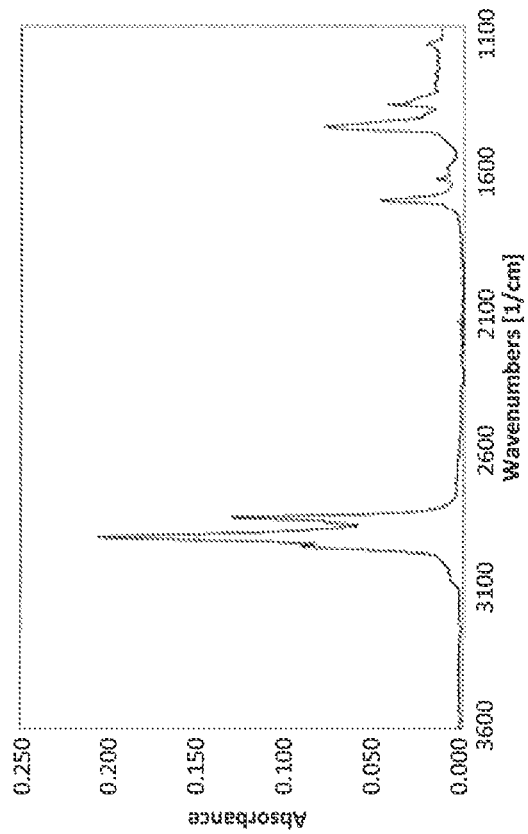
FIG. 5G: FTIR spectrum of sample PL14

DEVICE FOR THERMAL-CATALYTIC DECOMPOSITION-PYROLYSIS OF ORGANIC WASTE MATERIALS

RELATED APPLICATIONS

This application is the National Stage of International Patent Application No. PCT/IB2020/059752, filed Oct. 16, 2020, which is hereby incorporated herein by reference in its entirety, and which claims priority to Czech Patent Application No. PV 2019-645, filed Oct. 17, 2019, which is also incorporated herein by reference in its entirety.

TECHNICAL FIELD

The invention relates to a device for pyrolytic (thermic) splitting of organic material and pyrolysis oil manufactured by this process. The invention combines two scientific disciplines—physics and chemistry.

STATE OF THE ART

The manufacturers of non-renewable resources have been currently facing strong pressure to restrict utilisation of non-renewable resources as oil and other sources of fossil carbon involved in production of liquid fuels mainly for ground transport purposes. Fuels for spark-ignition engines in motor vehicles include mainly bio-ethanol produced through fermentation of agricultural crops with high saccharide content and fatty acid methyl esthers, manufactured by re-esterification of vegetable oils or optionally animal fats. There is a minor amount of fuel production using renewable resources formed by hydrocarbons obtained through hydrogenation of vegetable oils (HVO). Usable properties of bio-ethanol and fatty acid methyl esthers are worse in certain aspects when compared to properties of classic fossil fuels—bio-ethanol is distinct mainly for its miscibility with water and the resultant possible problems in terms of fuel quality deterioration over long-term storage periods with admission of air humidity worse fuel quality during long-term storage, methyl esthers suffer from worse stability in storage and thermal-oxidative stability. Production of hydrogenated vegetable oils, their usable properties for the use for compression ignition engines are very good, is then associated with high consumption of hydrogen and shorter service life of hydrogenation catalysts that are essential in the production process.

There are no further options for manufacturing of liquid fuels from renewable resources that would be common at this moment. Their production is expected to make use of various biomass types and employing mainly processes dealing primarily with the thermic or thermal-catalytic decomposition to form substances with lower boiling point, corresponding with the boiling point range pertaining to regular liquid fuels. Products obtained through such decomposition must be further process to ensure the resultant properties meet the requirements for quality of final products distributed among consumers. The alternative procedure to the above would be pyrolysis to produce synthesis gas and the subsequent synthesis of hydrocarbons suitable for production of liquid fuels.

Pyrolysis of vegetable oils and animal fats in a device featuring a skimming film on heated interior surface of the pyrolysis reactor is described by the patent CZ306462B6. Utilisation of a de-oxidizing agent mixed with various vegetable oils and other biological feedstock in a reactor fitted with a radiation source transmitting a certain amount of energy in the infra-red spectrum, while being subject to effects rendered by a magnetic-electric field has been described by the patent EP2129746.

Other patented procedures comprise action of catalyst throughout splitting of the feedstock material.

There is the U.S. Patent application US20110289826A1, for example, referring to the process of pyrolytic splitting of feedstock on organic oil basis in contact with calcined dolomite used as the catalytic agent. Production of pyrolysis oil through thermocatalytic splitting of waste materials in two stages in a device including the pre-treatment zone and the pyrolysis zone of material processed has been described in the patent EP3132004T3. A carrying out of pyrolysis of vegetable oils and other liquid feedstock inside a tubular furnace with feedstock injection via a nozzle for ultrasound atomisation of injected material has been stated in the patent application US20190144758A1.

Injection of feedstock into the reactor is paralleled with introduction of ammonia, methanol or hydrogen, there is a part of reactor also comprising the catalytic bed filled with materials based on zeolite, metal oxides, solid acid and alkaline catalysts. Apart from specific designs of various reactors for pyrolysis of vegetable oils and other, there are also descriptions to detail traditional refinery technologies, as the published in U.S. patent application US20070007176A1, where the feedstock decomposition is conducted in a fluid catalytic cracking (FCC) unit featuring a classic cracking catalyst as well as the usual process of its cyclic regeneration following the pyrolysis stage.

When carrying out pyrolysis to produce liquid portions, to be utilised in further processing with the aim to manufacture quality motor fuels, for example, the desired outcome is to maximise the yield from liquid phase at the expense of gases, coke or any possibly unreacted feedstock. Since the splitting conditions (high temperatures, simultaneous production of pyrolysis gas) usually involve penetration of some unsplit particles of feedstock into the product, it needs to be returned back into the thermal decomposition process.

SUBJECT MATTER OF THE INVENTION

The solutions presented herein follow the invention and apply to a device for carrying out of the transformation of chemical structure in cells of the original organic matter, conveniently in liquid state, as needed to form a different cellular structure and establish an absolutely new cell of organic matter. This method of the transformation may affect not only the original structure yet also the original state of matter. The cell referred to in this instance comprises the simplest chemically determined particle of organic matter.

For the purpose of description hereof, the physically chemical, thermal-catalytic method (decomposition) refers to disruption of the original material cell structure, when subject to effects of temperature and radiation with simultaneous utilisation of the temperature gradient.

The aim of this invention is to utilise a specific device and undemanding technological conditions (carried out under atmospheric pressure, absence of hydrogen), with or without a deoxidising agent, or optionally using a catalyst to process the original feedstock and obtain a product with lower molecular mass and high hydrocarbon content, or a low content of residual oxygen, suitable for subsequent refining to produce motor fuel components respectively.

The oxygen contained in ester groups of triglycerides of fatty acids is drained during the de-oxidizing—oxidising reactions mainly in form of carbon oxide and carbon dioxide. The scope of deoxidation was supported by residual petroleum fraction added and further significant reduction in content of oxygen groups has been achieved by means of catalyst supplement in the reaction mixture.

The substance of this invention comprises a device for thermal-catalytic decomposition—pyrolysis of organic waste materials, comprising the following:

the reservoir 1 for waste materials linked by means of the supply line 2 with the reactor 4 where in the line 2 is arranged the valve 3 to ensure control over the quantity of waste materials, wherein the reactor 4 contains the heating element 5 for heating and/or the radiation source 5a for decomposition of waste materials situated on the outside or inside of the reactor 4, approximately up to the maximum level corresponding to ⅓ of the height from the bottom 7 of the reactor 4; and the temperature sensor (6) in the vicinity of the heating element and/or the radiation source to control the supply of power, placed up to the maximum level corresponding to ⅓ of the height from the bottom (7) of the reactor (4), wherein the output line (10) protrudes from the lid (9) of the reactor (4) to carry gaseous components of the products obtained, with the linked cooler (16) for liquefying of gaseous components of products obtained, wherein the end of the output line 10 is connected to the orifice on the receiver 17 to contain liquefied products via branch 21 to exhaust product gases.

The preferable set-up with the sensor 11 and the cooler 16 on the output line 10 contains the control sensor 12 for control of chemical composition of gases exiting the reactor 4 and the throttle flap valve 13 to control the gas flow rate situated between the said sensor 11 and the cooler 16, wherein in the output line 10 is further arranged the intermediate cooler 14 linked to both the follow-up cooler 16 and the reflux 15 linked into the orifice on the reactor 4 outside the heating element 5.

Furthermore, the convenient configuration shall feature the top half of reactor 4 fitted with the temperature sensor 8 to establish the temperature of gaseous components of products obtained from waste materials.

For the purposes hereof, waste materials shall comprise organic feedstock for non-food applications, rather than specific waste materials as such.

One of the embodiments hereof comprises the output line 10 with convenient configuration of the sensor 11 for temperature and flow rate of gaseous components of the product.

The number and locations of sensors in the device according to the invention are preferably determined by the conditions for carrying out of the method, the device type and the specific type of feedstock or mixture thereof inclusive of any possible additives to be processed in particular device.

The radiation source 5a is arranged inside the reactor preferably immediately below the level of waste materials, while the maximum point of said level inside the reactor 4 reaches closely below the reflux 15.

The configuration and shape of the radiation source must provide optimal reaction surface depending on the size and shape of the reactor as well as the desired rate of decomposition. The convenient components include a spiral, double or multiple-twist spiral, a screw line or an inclined surface inside the reactor, or any combination of those.

Another convenient embodiment shall comprise the device with heating element 5 further fitted with an induction element or a gas burner.

Another convenient embodiment according to this invention is the reactor 4 preceded by the supply line 2 fitted with a preheater 18 to ensure preliminary heating of waste materials prior to their entry into the reactor 4.

The line before reactor is preferably fitted with the T-junction 19 to install the level gauge 20, preferably made of glass, as an indicator of content level inside the reactor and connected into the orifice on the reactor lid.

Yet another convenient embodiment of the invention features the vicinity of radiation source 5a inside the reactor 4 configured with the closing grid 22 to ensure hermetic sealing of the reactor and prevent any oxygen access.

The convenient embodiment of this invention also features the feedstock reservoir 1 containing waste material increased by up to 20% by weight of the material with prevailing quantity of high-boiling hydrocarbons and other organic substances, for example distillation residues and vacuum distillates of oil origin, more preferably provided with a catalyst based on a hydroxide of an alkaline metal, most preferably a mixture of KOH and NaOH.

The entire device has been built of stainless, heat-resisting and chemically-resistant steel with glass fibre insulation. The electricity supply installed for the heating element inside the reactor has been completed with ceramic grommets.

The convenient reactor for the pyrolysis is in particular the pot or tubular reactor.

The level of feedstock inside the reactor was subject to convenient check using the glass level gauge installed between the bottom of the reaction flask linked to the reservoir holding fresh feedstock and the reactor top by means of a convenient metal capillary forming the impulse piping.

The apparatus has been preferably provided with thermometer wells fitted with thermoelectric cells to ensure measurement of temperature under the raw material level, temperature of vapours above the said level and the temperature of vapours released from the reaction piping prior to their entry into the water cooler.

Actual Course of Reaction

I. Stage: Initiation (Initial Launch)

This stage involves supply of substances to be transformed together with other substances absolutely necessary for this transformation; those form either a homogeneous or heterogeneous mixtures, or entering on an individual and stepwise basis.

The initial energy required for initiation of splitting and further transform of feedstock is supplied to the reactor either via the radiation source installed inside, that is in the space for the best and fastest development of such initiation conditions or energy delivered into the reaction space by means of induction heating from the outside, with the energy directed at the interior shell of the reactor or the radiation source 5a, situated inside the reactor, or by combination of those heating options a gas-powered or another heating supply available.

The initial impulse is defined by the supply of energy to such an extent allowing utilisation of the temperature difference or thermal decomposition of individual substances. Once the particular temperature is reached, the substance is subject to thermal decomposition, followed by decomposition of other substances present inside the reactor. At this stage, all the substances are transformed into gaseous state reaching temperatures from 60 up to 600° C.

II. Stage: Propagation
a) Reaction Course and its Partial Control Inside the Reactor With a radical reaction in progress, while there is a complex mechanism in action to run various combining and decomposition processes, there are various intermediates or products being formed and subsequently decomposed, all the way up to the final reaction stage—termination (completion), occurring upon cooling of the last residues of gaseous radicals to a temperature level, where they stop any further decomposition and start interacting mutually.

This part of the reactor is fitted with sensing elements (measurement sensors) to monitor time, pressure, temperatures, quantities, flow rate and feedbacks from individual components to the technology to utilise feedback impulses for controlling of other technological segments and maintain the conditions set for reaction.

Therefore, the reaction is not subject to direct control using the chemism determined by calculations, yet it is rather indirect via the optimal conditions as set for the particular reaction in the tolerance level not substantially affecting impact on the course thereof.

Monitoring and comparison of data received from individual sensors in the course of reaction and verification of the process compliance, with a possible scope of deviation and its possible impact on the quality of finished product.

b) Course of Reaction and its Evaluation with Possible Measures—Outside the Reactor Once there are still individual radicals in mutual interaction leaving the reactor in the form of hot gases, one is still able to use the evaluation of data from individual measurement sensors and proceed with partial selection of chemical compounds representing the aim of the production, as well as those currently undesired in the finished product in order to capture and return those into the reaction space and their subsequent chemical transformation to generate chemical compounds desired for that particular moment.

Part III: Termination

The next termination stage of chemical transformation results in rapid cooling of hot gases in order to stop the radical reaction provided the existing products will no longer change and their composition remains constant and fairly stable while conforming to the chemical compounds to be produced.

Further processing of the chemical compounds produced then involves their treatment or upgrades as needed, that is in liquid, gaseous or solid states as applicable.

To be preferably used for production of fuels and lubricants from renewable resources, especially feedstock of vegetable origin, provided the process is capable of producing very pure hydrocarbons with the carbon chains of identical length as in the original feedstock, or optionally different lengths, as well as such compounds containing various combinations of elements present in the original substances, e.g. FFA (free fatty acids), alcohols, phenols, ketones, glycerine, esters and other substances containing mainly carbon (C), hydrogen (H), oxygen (O), nitrogen (N), phosphorus (P), calcium (Ca) or potassium (K).

The principle is based on partial control over the course of radical reaction in a specific device—reactor, with essential utilisation of difference between point of ignition or thermal decomposition of individual substances entering the reaction, both homogeneous as well as heterogeneous, or the aggressivity of one of those substances so intense it is able to disrupt the cellular structure in molecules in other feedstock to start the radical reaction.

Based on formation of certain time, temperature, pressure and other conditions to facilitate execution of the radical reaction in the reaction space and the subsequent cooling of gases obtained at the very particular moment produces exactly the structure of organic matter composition induced by the said conditions as optimal.

This transformation of chemical structures of the initial substances is conducted using a multi-functional apparatus—pyrolysis decomposition reactor—with subsequent processing of the resultant chemical substances comprising a few subsequent parts each to develop such transformation progressively.

Thermal splitting at higher temperature with no oxygen access changes the initial organic material containing carbon, hydrogen or optionally oxygen and other elements mainly into the liquid pyrolysis product (pyrolysis oil), pyrolyzed gas or optionally solid carbon residue. The yield ratio of these products depends on composition of the feedstock and process conditions, especially temperature and the reactor holding time. The average molecular mass of compounds contained in the pyrolysis oil is lower when compared to the initial feedstock. The possible feedstock includes used cooking oils, animal fats and other liquid mixtures of organic origin, preferably liquid substances alone or mixtures thereof.

The pyrolysis oil produced can be preferably used for manufacturing of liquid fuels.

One of the convenient embodiments of the device for carrying out pyrolysis (thermal splitting of material) of organic origin, especially waste materials, comprises specific parts of the device for pre-heating of feedstock, a pyrolysis reactor, a partial condenser unit and a condenser for pyrolysis oil. The pre-heating of feedstock is carried out by means of an exchanger, with the feedstock being pre-heated at 200° C. up to 400° C. Following the pre-heating exchanger, the material enters the pyrolysis reactor with further heat supplied to ensure splitting reactions at 250° C. p to 430° C. Products obtained through the splitting are extracted into the cooler in vapour phase, where partial condensation occurs, involving the portions with the highest boiling point. These portions are then re-mixed with the feedstock and enter the pyrolysis reactor. The quantity of product not condensed inside the cooler for partial condensation is exhausted into another cooler (the heat exchanger) to undergo complete condensation, except for pyrolysis gases. There is also a small amount of unsplit feedstock containing solid portions (coke) extracted from the pyrolysis reactor on successive basis.

Prior to its entry into the reactor, the feedstock is preferably mixed with a small volume of material containing a large portion of high-boiling hydrocarbons and other organic substances, for example distillation residues and vacuum distillates of oil origin, soot or coal.

The energy required to bring the feedstock to the splitting temperature level is fed into the pyrolysis reactor directly, using the radiation source fitted inside the reactor or indirectly, by means of induction heating facility, where the amount of energy needed is transferred onto the radiation source using a coil arranged outside the reactor space. This method of reactor heating can be combined with another heating unit featuring a solid fuel burner. Such burner can be preferably using the gas portion of product obtained through pyrolysis.

The portion of unreacted feedstock extracted from the bottom of pyrolysis reactor containing insoluble substances (coke) ensures the insoluble substances do not accumulate inside the reactor throughout continuous operation of the device.

The thermal splitting using the procedure executed in the device described herein can be adapted by adjustment of process conditions, especially the reaction temperature of pyrolysis, the level height inside pyrolysis reactor, the holding time, the temperature of partial condensation cooler and the amount of added material containing high-boiling hydrocarbons and other organic substances, in order to affect the composition of product obtained through pyrolysis mainly with respect to the content of unsaturated hydrocarbons and oxygen substances.

The composition of pyrolysis product can be further affected to decrease the content of oxygen substances with by adding a catalyst into the pyrolysis reactor. As the catalyst a melt of hydroxides of alkaline metals, mainly Na and K was used.

As far as the terms heterogeneous and homogeneous de-oxidations are concerned, the homogeneous de-oxidation involves a deoxidizing agent miscible with the liquid feedstock (petroleum distillation residue), wherein the heterogeneous de-oxidation deals with a non-miscible one (soot, coke with oil, or vice versa straw, sawdust with asphalt).

For the purpose of this invention, the deoxidizing agent is a raw material with high carbon excess content, added at a certain ratio to the initial feedstock intended for de-oxidation to affect the final product of de-oxidation.

For the purpose of this invention, de-oxidation is interpreted as the process occurring in this device to heat the carbon contained in in the deoxidizing agent to its ignition point, while the environment is preserved from access of oxygen and holding the heated carbon to rip oxygen required for its ignition from the initial feedstock, disrupting the cell of initial feedstock and initiating the radical reaction. This reaction results in deoxidizing of the initial feedstock, the content of oxygen compounds is reduced, while the content of pure hydrocarbons rises.

BRIEF DESCRIPTION OF DRAWINGS

FIG. 5A, 5B, 5C, 5D, 5E, 5F, 5G—shows FTIR Spectrum of Sample PL8, PL9, PL10, PL11, PL12, PL13, and PL14;

EXAMPLES

Figure 1:
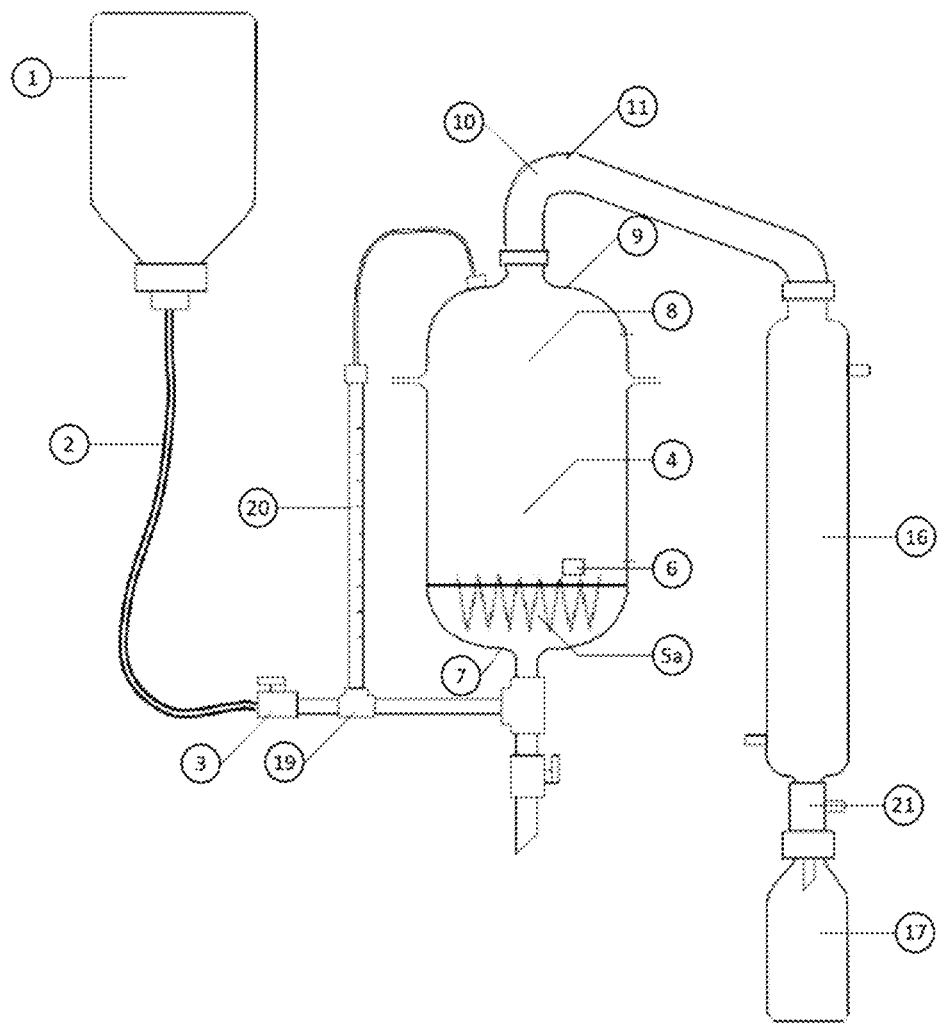
FIG. 1—shows the first embodiment of the device as defined in the invention—unconnected reflux pot reactor.

Input Substances Subject to Pyrolysis:
  Food Quality Oils:
    Rape seed oil: Density at 15° C.: 919.1 kg·m-3
      Kinematic viscosity at 40° C.: 39.8 mm2 s-1
      Ignition point: 235° C.
      Palmitic acid: 3.8% by weight
      Palmitic acid: 3.8% by weight
      Oleic acid: 61.8% by weight
      Linoleic acid: 32.3% by weight
    Sunflower oil: Density at 15° C.: 919.1 kg·m-3
      Kinematic viscosity at 40° C.: 38.3 mm2 s-1
      Ignition point: >250° C.
      Palmitic acid: 7.6% by weight
      Stearic acid: 4.9% by weight
      Oleic acid: 21.1% by weight
      Linoleic acid: 66.4 by weight
  Vacuum Residue (VR) of Petroleum from Russian Export Mixture (VZ PSP, Litvinov Refinery):
      Penetration: 213 p.u.
      Density: 1006.2 kg·m-3
      Viscosity at 100° C.: 1850 mPa·s
      Viscosity at 150° C.: 156 mPa·s
      Asphaltene content: 5.8% by weight
      Sulphur content: 2.1% by weight
  Atmospheric Distillation Residue from Mix of Azeri Light and CPC Petroleum (Kralupy n. Vlt. Refinery):
      Density: 960.5 kg·m-3
      Viscosity at 100° C.: 180 mPa·s
      Sulphur content: 2.1% by weight Specific Examples of the Device According to the Invention Example No. 1: Unconnected Reflux Pot Reactor (See FIG. 1)

The reservoir 1 is fitted with the supply line 2 running through the control valve 3 into the pot reactor 4 delivering the liquid feedstock (vegetable oil—food quality) that is subject to pyrolytic decomposition in the temperature range between 380 and 430° C., using the radiation source 5a, comprising a resistance wire passing closely below the level of liquid decomposed by means of pyrolysis, approximately ¼ way up from the reactor bottom, while the pyrolytic temperature range is monitored by the sensor 6 comprising a thermocouple in a thermowell, preferably made of glass, to show the level of content inside the reactor and connected to the reactor lid.

The level of feedstock inside the reactor is preferably monitored using the level gauge 20, preferably made of glass and connected to the orifice in the lid 9 of the reactor 4. The level gauge 20 is preferably connected by means of the T-junction 19 situated before the reactor.

The temperature of pyrolyzed gases developed is measured using the sensor 8 and the output line 10 is linked with the sensor 11 to interpret the flow rate and the temperature data with subsequent cooling and liquefying of such gases inside the cooler 16, while the remaining gaseous portion of hydrocarbons passes through the member 21 and vented away the liquid product receiver 17.

Figure 2:
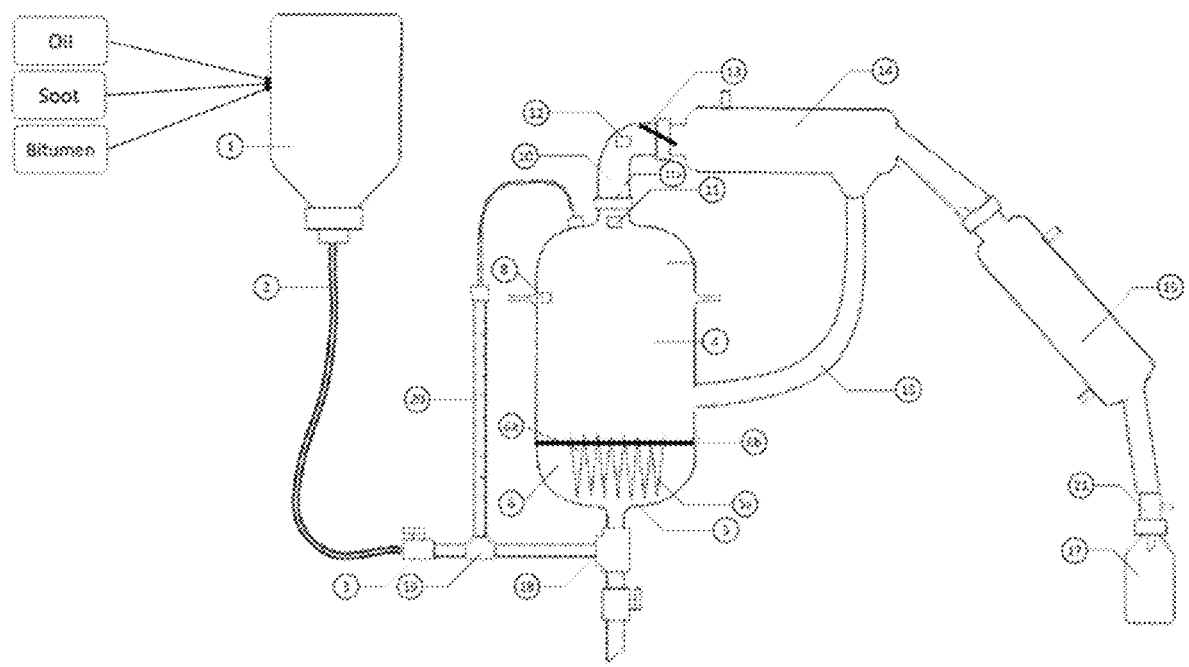
FIG. 2—shows the second embodiment of the device defined in the invention—pot reflux reactor (homogeneous de-oxidation)

Example No. 2: Pot Reflux Reactor (Homogeneous De-Oxidation) (See FIG. 2)

It is used de-oxidizing agent—petroleum distillation residue and vegetable oil in such manner the distillation residue is filled into the reactor 4, pre-heated to the temperature closely approximating its intensive cracking point (approx. 410 degrees Celsius), whereas the input line 2 before the reactor 4 is preferably fitted with the pre-heater 18.

A catalyst comprising a mixture of KOH and NaOH can be preferably added. Once the temperature of 410 degrees Celsius has been reached, the radiation source fitted closely below the distillation residue level will be powered on and doses of mixture containing oil and 5% of the distillation residue or soot will be introduced into the reactor.

In the Space Filled with Distillation Residue (Soot) the Following Three Sensors are there:
1) The temperature sensor 6 for monitoring of the distillation residue, its feedback switches on possible cooling;
2) The temperature sensor 6b for the distillation residue level, its feedback increases the feed of reaction mixture to maintain the efficient radiation source closely submerged on constant basis;
3) The temperature sensor 6a for the radiation source 5a, its feedback increases the power input of the source in case when the temperature drops.

Sensors Situated Inside the Reactor:
4) The temperature sensor 8 to monitor the product vapours developed inside the reactor;

Sensor Fitted Behind the Reactor:
5) The sensor 11a behind the reactor at the exhaust of gases into the cooler to monitor the gas mixture and its compliance with the expected composition (target state), the feedback opens access to the reflux apparatus/or into the cooler directly; The reflux apparatus has an outlet to return all the above-mentioned boiling portions back into the reaction space.

The output line 10 between the sensor 11 and the cooler 16 is provided with the control sensor 12 for control of chemical composition of gases existing the reactor 4 and the throttle flap valve 13 to adjust the flow rate of gases connected in parallel, while the output line 10 is further fitted with the intermediate cooler 14 connected to both the subsequent cooler 16 as well as the reflux 15 connected to the reactor 4 outside the heating element 5.

Figure 3:
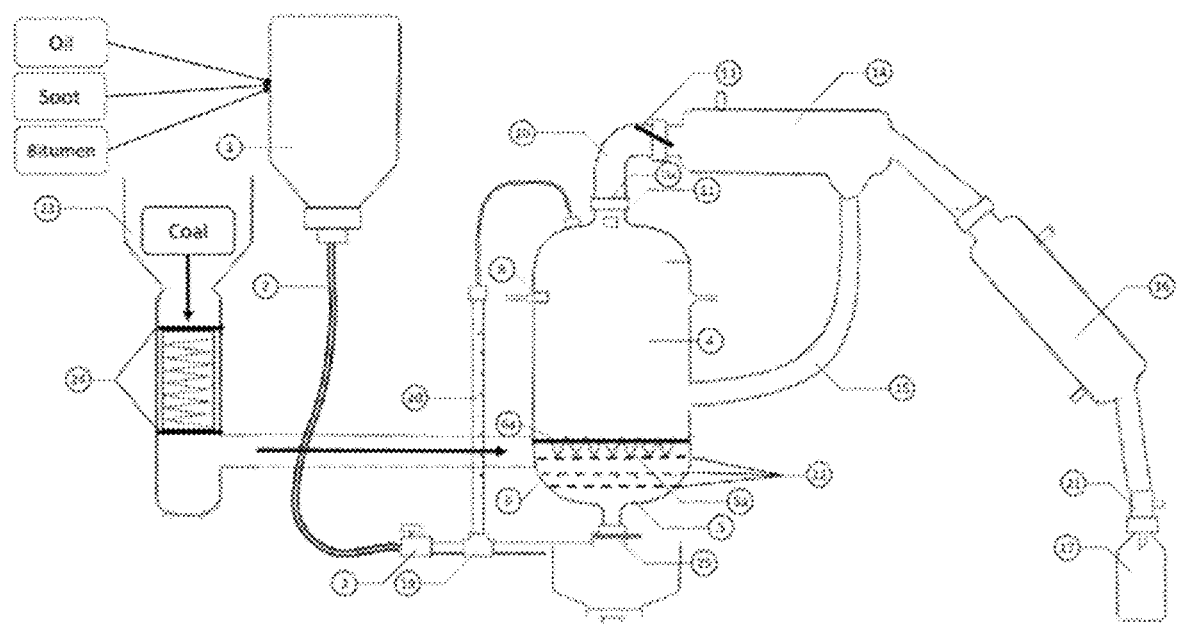
FIG. 3—shows the third embodiment of the device defined in the invention—pot reflux reactor (heterogeneous de-oxidation)

Example No. 3: Pot Reflux Reactor (Heterogeneous De-Oxidation) (See FIG. 3)

The process used de-oxidizing agent—distillation residue and vegetable oil provided that coal (coke) was filled into the reactor, pre-heated to the temperature of approximately 700 degrees Celsius, a catalyst comprising a mixture of KOH and NaOH can be preferably added. Once the temperature of 700 degrees Celsius had been reached, the radiation source 5a fitted closely below the distillation residue level was powered on and doses of mixture containing oil and 5% by weight of the distillation residue or soot was introduced into the reactor.

This is difference from the Example No. 2 in that the process involves heterogeneous de-oxidation.

The heat fed into the pot reactor 4 is produced using the hopper 23 and closing valves 24 to supply coal or coke into the device, with its subsequent pre-heating to the set temperature of 700 degrees Celsius.

In terms of the technology used, the device is also fitted with the grid 22, which needs to be hermetically sealed off the ambient environment.

Discharge of ash below the reactor is ensured through the flap valve 25.

In the Space Filled with Distillation Residue (Soot) there are Three Following Sensors:
1) The temperature sensor 6 for distillation residue, the feedback switches on possible cooling
2) The level sensor 6b for feedstock—coal (coke), the feedback completes the feedstock in order to keep the radiation source submerged in the feedstock
3) The temperature sensor 6a of radiation source, its feedback increases or decreases the power input Sensors Situated Inside the Reactor:
4) The temperature sensor 8 for temperature of gases developed inside the reactor
5) The sensor 11 for temperature and flow rate of gases produced, feedback for mixture dosing Sensor Fitted Behind the Reactor:
6) The sensor ha behind the reactor at the exhaust of gases into the cooler to monitor the gas mixture complies with the expected composition (target state), the feedback opens input into the reflux apparatus/or into the cooler directly;

The reflux apparatus has an outlet to return all the above-mentioned boiling portions back into the reaction space.

Figure 4:
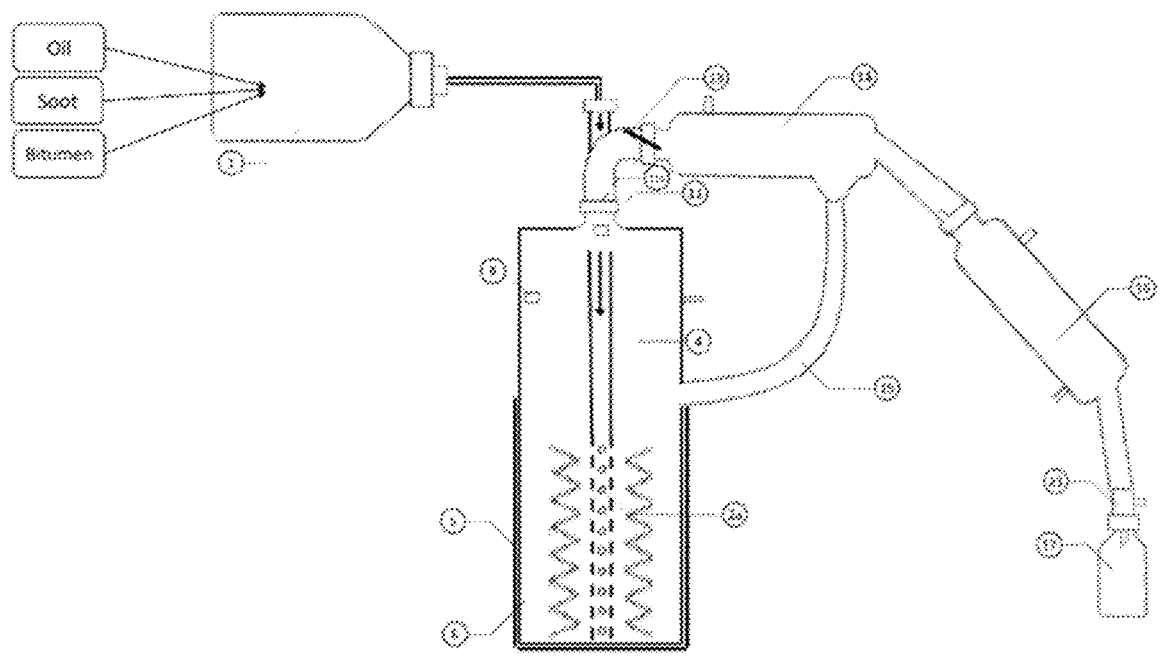
FIG. 4—shows the fourth embodiment of the device defined in the invention—tubular reflux reactor.
Figure 6:
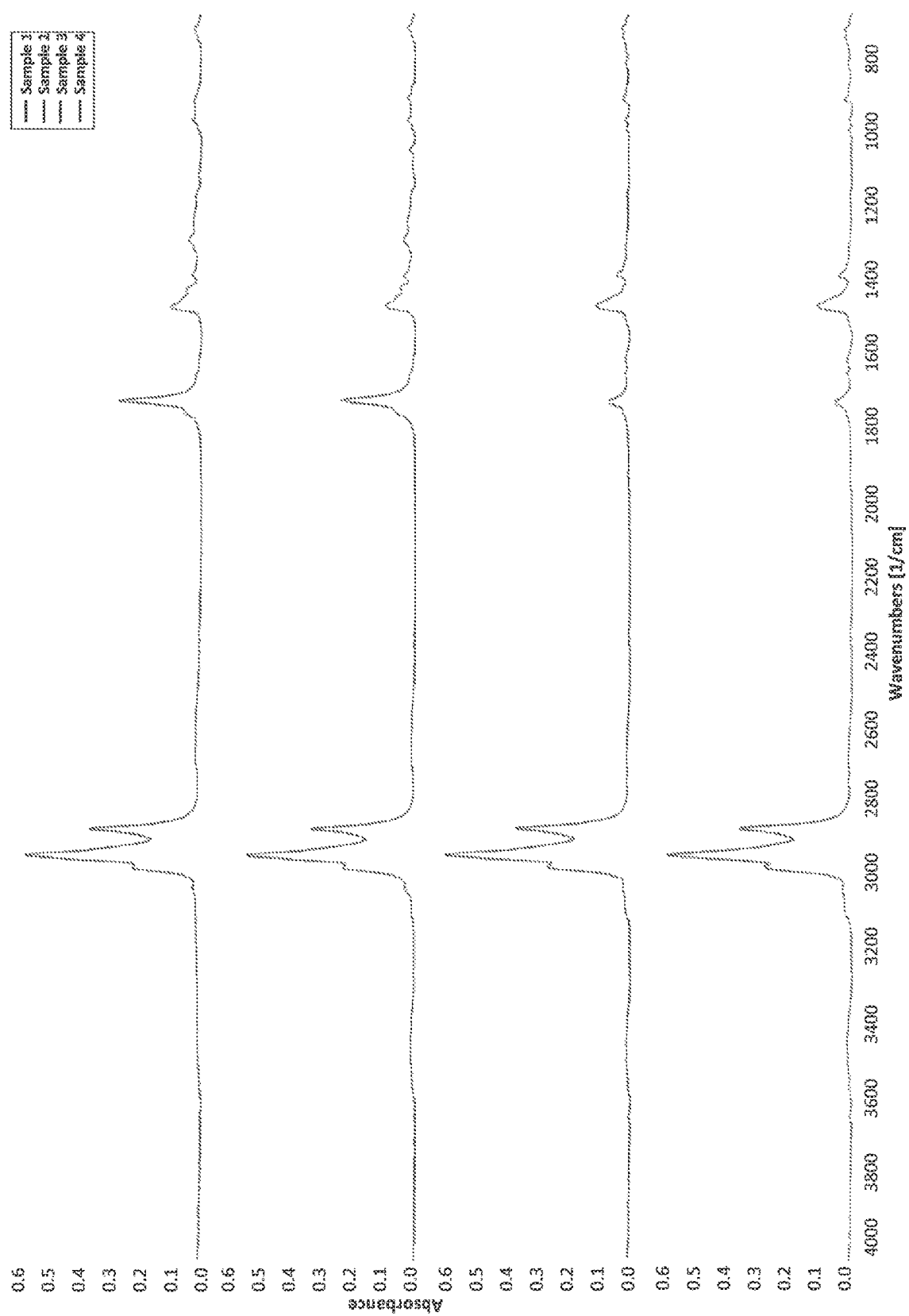
FIG. 6—shows Absorbance against Wavenumber for Samples 1 to 4.

Example No. 4: Tubular Reflux Reactor (See FIG. 4)

The heating element 5 comprising an induction element (optionally solid fuel burner) was involved to warm up the entire surface of tubular reactor and once the whole surface has reached the reaction temperature, the same was sprayed uniformly with a mixture consisting of oil and de-oxidizing agent—distillation residue (or soot), the ratio of distillation residue in this case reaches 5-70% by the weight, with respect to the full mixture weight 1) The temperature sensor 6a for reaction surface, feedback to increase or decrease the power input
2) The temperature sensor 6 for gases, feedback to decrease or increase the feedstock dosing rate
3) The temperature sensor 8 for gases developed inside the reactor
4) The sensor 11 for temperature and flow rate of gases produced, feedback to control mixture dosing, increase and decrease of pressure inside the reactor (or optionally the reaction time inside the reactor)
5) The sensor 11a behind the reactor at the exhaust of gases into the cooler to monitor the gas mixture and its compliance with the expected composition (target state), the feedback opens input into the reflux apparatus/or into the cooler directly; The reflux apparatus has an outlet to return all the above-mentioned high-boiling portions back into the reaction space.

The products obtained were subjected to analysis using the FTIR spectrometry (infra-red spectrometry including Fourier transformation) as shown in FIG. 5A, FIG. 5B, FIG. 5C, FIG. 5D, FIG. 5E, FIG. 5F, and in FIG. 5G.

| Feedstock | Liquid product marking | Remark |
|---|---|---|
| Sunflower oil | PL8 | |
| Sunflower oil, atmospheric distillation residue, $Al_2O_3$ catalyst | PL9 | |
| Sunflower oil, atmospheric distillation residue, FCC catalyst | PL10 | |
| Rendering fat | PL11 | |
| Sunflower oil, $Na^+$ catalyst | PL12 | First product sampling |
| | PL13 | Second product sampling |
| | PL14 | Third product sampling |

FTIR spectra of individual samples, as by FIGS. 5A, 5B, 5C, 5D, 5E, 5F and 5G, in the following table below details the areal ratios of bands in FTIR spectra corresponding with carbonyl and carboxylic groups against band areas corresponding with groups of carbonaceous frameworks of both sole hydrocarbons as well as hydrocarbon strands of another compound, i.e. carboxylic acids, esters of carboxylic acids etc. are stated. Application of catalyst in the feeding brought a significant reduction of carbonyl and carboxylic groups in the final product (PL12 to PL14).

| Liquid product of pyrolysis | Band intensity ratio 1550-1850 $cm^{-1}$/2700-3000 $cm^{-1}$ |
|---|---|
| PL8 | 0.78 |
| PL9 | 0.68 |
| PL10 | 0.68 |
| PL11 | 0.88 |
| PL12 | 0.12 |
| PL13 | 0.09 |
| PL14 | 0.19 |

Infra-Red Spectra:

The figures below represent examples of infra-red spectra obtained through analysis of products from the last stage of experiments. The batch includes Sample 1-Sample 4. Samples 3 and 4 were obtained upon addition of a sodium-based catalyst into the reaction mixture, the samples marked as Sample 1 and 2 serve for reference. The presence of additive brought a positive effect that can be summarised as follows: The spectra can be interpreted by means of spectral band extent at 1700 and 2900 cm−1 to conclude the content of compounds with oxygen in these samples reaches only less than ten percent already. The samples contain mainly saturated hydrocarbon chains, indicated by the low band of C=C—H vibrations at 3100 cm-1.

The composition of products is affected by adjustment of the reaction conditions, or optionally the composition of feedstock, addition of the catalyst or any other oxidising, hydrogenation or even deoxidising and dehydrogenation agents.

INDUSTRIAL APPLICATIONS

This invention can find application in refineries, petrochemical, chemical, waste management and environment preservation industries, as well as in special chemical plants, etc.

LIST OF REFERENCE MARKS

Reservoir—1
Supply line—2
Feed input line—2a
Valve—3
Reactor—4
Heating element—5
Radiation source—5a
Temperature sensor—6
Radiation source temperature sensor—6a
Feedstock level temperature sensor—6b
Distillation residue monitoring level sensor—6b
Reactor bottom—7
Temperature sensor for exhaust gases behind reactor—8
Reactor lid—9
Output line—10
Temperature and flow rate sensor—11
Gas mixture composition check sensor—11a
Control sensor—12
Throttle flap valve—13
Intermediate cooler—14
Reflux—15
Cooler—16
Receiver—17
Pre-heater—18
T-joint—19
Level gauge—20
Branch for product gas exhaustion—21
Closing grit—22
Coal (coke) reservoir—23
Closing flap valves—24
Ash discharge flap valve—25

The invention claimed is:

1. A device for thermal-catalytic decomposition-pyrolysis of liquid organic waste materials comprising:
   a reservoir for the organic waste materials, linked by means of a supply line with a reactor, where
   a valve is arranged in the supply line to ensure control over the quantity of the organic waste materials, wherein
   the reactor contains a heating element and a radiation source for heating the liquid organic waste materials, wherein the heating element is located on outside of the reactor, up to a maximum level corresponding to ⅓ of the height from the bottom of the reactor, wherein the radiation source is located inside the reactor and is capable to be submerged in the liquid organic waste materials; and
   a temperature sensor in the vicinity of the heating element and/or the radiation source to control a supply of power, placed up to the maximum level corresponding to ⅓ of the height from the bottom of the reactor,
   wherein an output line protrudes from a lid of the reactor to carry gaseous components of products obtained, with a linked cooler for liquefying of the gaseous components of products obtained,
   wherein an end of the output line is connected to an orifice on a receiver to contain liquefied products via a branch to exhaust product gases.

2. The device according to claim 1, wherein the top half of the reactor is fitted with a temperature sensor to determine the temperature of gaseous components obtained from waste materials.

3. The device according to claim 1, wherein the output line is fitted with a sensor for monitoring of temperature and flow rate of gaseous product components.

4. The device according to claim 3, wherein the sensor and the linked cooler are designed with the output line containing a serial configuration involving a control sensor to check the chemical composition of gases leaving the reactor and a throttle flap valve to control the gas flow rate situated between the said sensor and the linked cooler, wherein in the output line is further arranged an intermediate cooler connected to both a follow-up cooler and a reflux, connected into an orifice on the reactor outside the heating element.

5. The device according to claim 1, wherein the radiation source comprises a resistance wire in a shape of a spiral, double twist spiral, or multiple twist spiral.

6. The device according to claim 1, wherein the heating element is an induction element or a solid fuel burner.

7. The device according to claim 1, wherein the reactor is preceded by the supply line fitted with a preheater to ensure preliminary heating of waste materials prior to their entry into the reactor.

8. The device according to claim 1, wherein the reactor is preceded by the supply line fitted with a T-joint for connection of a level gauge as the indicator of level height inside the reactor and its orifice in the lid of the reactor.

9. The device according to claim 1, wherein a closing grid is arranged in the vicinity of the radiation source inside the reactor to ensure hermetic sealing of the reactor and prevention of any influx of oxygen.

\* \* \* \* \*

UNITED STATES PATENT AND TRADEMARK OFFICE
CERTIFICATE OF CORRECTION

| | | |
|---|---|---|
| PATENT NO. | : 12,350,659 B2 | Page 1 of 1 |
| APPLICATION NO. | : 17/769405 | |
| DATED | : July 8, 2025 | |
| INVENTOR(S) | : David Silhan | |

It is certified that error appears in the above-identified patent and that said Letters Patent is hereby corrected as shown below:

On the Title Page

Item (73) Assignee is incorrectly listed as Aikona Ltd. Assignee should be listed as Aikona DNS A.S.

Signed and Sealed this
Twenty-third Day of December, 2025

John A. Squires
*Director of the United States Patent and Trademark Office*